United States Patent Office 3,644,602
Patented Feb. 22, 1972

3,644,602
PROCESS FOR PRODUCING TRIALKYL PHOSPHATES
Edward F. Orwoll, Baltimore, Md., assignor to
FMC Corporation, New York, N.Y.
No Drawing. Filed Aug. 5, 1968, Ser. No. 749,971
Int. Cl. C07f 9/08; C07c 31/30
U.S. Cl. 260—974                                    10 Claims

ABSTRACT OF THE DISCLOSURE

Process for the preparation of tris($C_6$ to $C_{12}$ alkyl) phosphates from phosphoryl chloride and a corresponding alkali metal ($C_6$ to $C_{12}$) alkoxide. The alkali metal ($C_6$ to $C_{12}$) alkoxide is prepared in high yield and high purity by an alkoxide exchange reaction between an alkali metal alkoxide of a $C_4$ or $C_5$ saturated primary alcohol and a $C_6$ to $C_{12}$ alcohol.

BACKGROUND OF THE INVENTION

Field of the invention

Process for producing trialkyl phosphates.

Description of the prior art

Several methods for manufacturing trialkyl phosphates are known and practiced commercially. One is the direct reaction between phosphorus oxychloride and an excess of alcohol which produces trialkyl phosphates and hydrogen chloride. The hydrogen chloride however cleaves the trialkyl phosphates to produce the corresponding alkyl chlorides and mono- and di-alkyl acid phosphates. This cleavage may be minimized by various expedients such as operating under vacuum, operating at reflux in a low-boiling solvent to expel hydrogen chloride as completely as possible, or by using a very large excess of the alcohol. But at best an irreducible minimum of cleavage occurs and the yield of trialkyl phosphate based on phosphorus oxychloride under practical commercial conditions rarely exceeds 80–85%.

Purification of crude tris($C_6$–$C_{18}$ alkyl) phosphates containing mono- and di-alkyl acid phosphates, includes washing the crude material with dilute sodium hydroxide solution which forms sodium salts of the acid phosphates. The sodium salts of mono- and di-($C_6$–$C_{18}$ alkyl) acid phosphates, particularly of the 2-ethylhexyl acid phosphates, are very effective wetting and emulsifying agents. These sodium salts emulsify the trialkyl phosphate with the wash solution thus preventing separation of the organic phase from the aqueous phase. The emulsions are extremely stable and so difficult to break that the process becomes infeasible for the manufacture of tris($C_6$–$C_{18}$ alkyl) phosphates such as tris(2-ethylhexyl) phosphate.

Yields and processing facility are improved by utilizing an acid acceptor to neutralize the hydrogen chloride produced in this process. The use of tertiary amines for this purpose is well known and gives excellent yields. Tertiary amines are expensive, however, and thus must be recovered and recycled. Since in practice the tertiary amines can never be completely recovered, this process involves added material and processing costs which can rarely be tolerated.

Another commercial process mixes phosphorus oxychloride with at least three molar proportions of sodium alkoxide in an excess of the corresponding alcohol and/or an inert solvent. The formation of mono- and di-alkyl phosphoric acids and/or salts is greatly reduced and can occur only to the extent of the amount of free alkali present in the sodium alkoxide plus the small amount of hydrolysis of trialkyl phosphate which may take place during refining of the crude product. The yield and purity of the product are very good and emulsification problems during purification are minimized.

The sodium alkoxide for use in this alternate process may be prepared by the reaction of sodium metal with the appropriate alcohol but the cost of sodium metal makes this route commercially unattractive. Tris(lower alkyl) phosphate esters such as tributyl phosphate are made economically from alkoxides prepared by azeotropic dehydration of a mixture of sodium hydroxide and the appropriate alcohol. Although absolute dehydration of the sodium hydroxide-alcohol system is not attained in an economically acceptable time period, the free sodium hydroxide is brought to a sufficiently low level to permit yields of 90% of the lower trialkyl phosphates.

Higher alcohols, such as 2-ethylhexanol, are incompatible with sodium hydroxide. As the dehydration of the mixture of sodium hydroxide and 2-ethylhexanol proceeds, the sodium hydroxide precipitates out as an intractable coating on the walls of the reaction vessel and on heat exchanger surfaces. Although the dehydration may be accomplished on a laboratory scale after many hours of refluxing, it is too slow to be practical on a commercial scale as the system is eventually clogged with solid sodium hydroxide, and the product, sodium alkoxide, contains too much free sodium hydroxide.

It is a principal object of this invention to produce higher trialkyl phosphates in good yield and purity.

SUMMARY OF THE INVENTION

I have now discovered that tris(2-ethylhexyl) phosphate can be prepared from phosphorous oxychloride and sodium 2-ethylhexoxide formed by the alkoxide exchange reaction of sodium butoxide with 2-ethylhexanol. In the present process sodium 2-ethylhexoxide is formed by first preparing sodium butoxide by dehydrating a mixture of sodium hydroxide and butanol and then allowing the sodium butoxide thus formed to react with 2-ethylhexanol whereby sodium 2-ethylhexoxide is formed. Alternately, the sodium hydroxide may be reacted with 2-ethylhexanol containing sufficient butanol to render the mixture compatible and upon dehydration by fractional distillation to form mixed alkoxides of butanol and 2-ethylhexanol. Continued fractional distillation, with removal of dry butanol, causes the alkoxide exchange to occur, and with complete removal of butanol forms sodium 2-ethylhexoxide free of sodium butoxide. In the preferred embodiment of the present invention, a mixture of butanol and 2-ethylhexanol is heated to reflux in a reaction vessel equipped with a column. An aqueous solution of sodium hydroxide is fed into the top of the column where it reacts with the refluxing butanol to form sodium butoxide. Water distills off as a constant boiling mixture with butanol. The nonvolatile sodium butoxide drops from the column into the reaction vessel where it reacts with 2-ethylhexanol to form sodium 2-ethylhexoxide and butanol. After all the sodium hydroxide has been added and the water has been removed from the reaction mixture, the remaining butanol is distilled off to leave a mixture of sodium 2-ethylhexoxide and excess 2-ethylhexanol. This mixture is treated with phosphorus oxychloride to form tris(2-ethylhexyl) phosphate.

An important advantage of the present process is that the sodium alkoxide resulting from the alkoxide exchange reaction contains substantially no free alkali and thus permits the preparation of high purity trialkyl phosphates in exceptionally high yields.

Another advantage is that the product sodium alkoxide is prepared in high yield much more rapidly than is possible by the prior art method of dehydrating a mixture of sodium hydroxide and the appropriate alcohol.

DESCRIPTION OF THE INVENTION AND THE PREFERRED EMBODIMENTS

The present process for the preparation of tris(2-ethylhexyl) phosphate from phosphorus oxychloride and sodium 2-ethyl hexoxide formed by an alkoxide exchange reaction of sodium butoxide with 2-ethylhexanol may be used to prepare tris($C_6$ to $C_{12}$ alkyl) phosphates. The sodium alkoxides or other alkali metal alkoxides can be made from any saturated aliphatic or cycloaliphatic alcohol containing 6 to 12 carbon atoms and the alkali metal alkoxide of a $C_4$ or $C_5$ saturated primary alcohol such as n-butanol, isobutanol, 2-methyl-1-butanol, 3-methyl-1-butanol, 1-pentanol and the like. The preferred $C_4$ or $C_5$ alcohol is n-butanol. The $C_6$ to $C_{12}$ alcohols may be primary or secondary; the aliphatic chains may be straight, branched, or cyclic, and may contain aromatic, heterocyclic, or other substituents which are stable under the conditions of the reaction. Sodium alkoxides, potassium alkoxides, or lithium alkoxides may be prepared by the present process by using the appropriate alkali metal or alkali metal hydroxide. Sodium hydroxide is preferred as the most economical reactant for making the alkoxides.

The preferred embodiment of the present process heats butanol and 2-ethylhexanol to reflux in a reaction vessel equipped with a column. An aqueous solution of 50% sodium hydroxide is fed into the top of the column where it reacts with the refluxing butanol to form sodium butoxide. Water distills off as a constant boiling mixture with butanol. The nonvolatile sodium butoxide drops from the column into the reaction vessel where it reacts with the 2-ethylhexanol to form sodium 2-ethylhexoxide and butanol. After all the sodium hydroxide has been added and the water has been removed from the reaction mixture, the remaining butanol is distilled off to leave a mixture of sodium 2-ethylhexoxide and excess 2-ethylhexanol.

In operating this process, I prefer to use mixtures of butanol and 2-ethylhexanol containing 5 to 25% by weight of butanol. Smaller quantities of butanol may be used, the smallest being that which will fill the top of the column where the sodium hydroxide is added. More than 25% of butanol may be used, but larger amounts lower the productivity of the reactor. The final concentration of the solution or suspension of sodium 2-ethylhexoxide in 2-ethylhexanol must be one which permits easy handling (pumping) of the mixture. A 30% concentration of sodium 2-ethylhexoxide is preferred, although a 40% concentration is operable.

In the reaction of the sodium 2-ethylhexoxide with phosphorus oxychloride to form tris(2-ethylhexyl) phosphate the reactants are added in stoichiometric amounts of at least 3 moles of sodium 2-ethylhexoxide per mole of phosphorus oxychloride. No advantage is gained in using a pronounced excess of either reactant; it is advantageous to use a slight excess of the sodium alkoxide in order to consume completely alkyl phosphorochloridates which are hydrolytically unstable and tend to generate acidity in the finished product.

The alkoxide exchange reaction may be conducted at temperatures from 75° C. to 255° C. At lower temperatures the rate of water removal is too slow. At higher temperatures too much by-product formation occurs and the alcohols may dehydrate. The preferred operating temperature range is 150–160° C. in the preparation of sodium 2-ethylhexoxide. At temperatures substantially above 160° C. complex side reactions occur producing 2-ethylhexyl 2-ethylhexoate and other by-products. Though these by-products are formed in only minor amounts, they prevent production of a high purity product.

The reaction of sodium 2-ethylhexoxide with phosphorus oxychloride is carried out at a maximum temperature of 100° C. and preferably at 30–60° C. Cooling is needed to control the temperature because the reaction is highly exothermic. Byproducts form at temperatures above 60° C. A minimum reaction temperature is determined by the viscosity of the product slurry, not by the reaction rate. For example, the reaction proceeds satisfactorily at 0° C. but the product slurry is too thick for easy handling.

The alkoxide exchange reaction can be conducted at atmospheric, superatmospheric, or subatmospheric pressure. Subatmospheric pressures are desired as they minimize alkoxide exchange by-product formation. As the alkoxide exchange reaction is preferably conducted at 150–160° C. the reaction pressure is chosen so that the reaction mixture boils at a temperature of approximately 150° C. In the case of sodium 2-ethylhexoxide, the preferred pressure is approximately 100–200 millimeters mercury pressure.

The reaction of sodium 2-ethylhexoide with phosphorus oxychloride is effected at ambient pressures with no advantages achieved by using either higher or lower pressures.

The reaction time in this process is determined by the efficiency of the equipment in removing water and lower alcohol. The reaction of sodium hydroxide with lower alcohol to form sodium alkoxide and the reaction of sodium alkoxide with the higher alcohol to form the desired sodium alkoxide are very rapid. Excessive distillation times result in undesirable by-products in the final product. It is necessary to attain esentially complete removal of the lower alcohol to avoid the production of mixed phosphate esters, such as butyl di-(2-ethylhexyl) phosphate.

The reaction time of the sodium 2-ethylhexoxide with phosphorus oxychloride to form tris(2-ethylhexyl) phosphate is determined by the rate of addition of phosphorus oxychloride to sodium 2-ethylhexoxide. The rate of addition is controlled to keep the reaction temperature at 60° C. or below.

Diluents, for example dibutyl ether or nonane, may be used to dilute the alkoxide exchange reaction mixture. The diluent should have a boiling point above that of the lower alcohol and below that of the higher alcohol to aid in stripping the lower alcohol from the reaction vessel and to permit easy removal of the diluent. If sufficient diluent is used to give a pumpable suspension or slurry of the alkoxide, the excess amount of 2-ethylhexyl alcohol used in the reaction vessel may be reduced. The proportion of the diluent can be varied over a wide range, since its function is to aid in complete stripping of the lower alcohol from the higher alcohol. Preferably a relatively small amount of diluent, on the order of 5 to 25% of the reaction mixture charge, is used. The use of substantially greater portions of diluent is permissible but productivity suffers and compatibility of reactants is impaired.

The reaction of an alkali metal $C_6$ to $C_{12}$ alkoxide with phosphorus oxychloride is carried out using an excess of the $C_6$ to $C_{12}$ alcohol as a reaction diluent. For example, in the reaction of sodium 2-ethylhexoxide with phosphorus oxychloride, excess 2-ethylhexanol serves as a reaction diluent. However, an inert diluent may be present if desired.

The alkoxide exchange process of this invention may be run as a batch or continuous process. The reaction of a sodium alkoxide with phosphorus oxychloride, is preferably conducted by adding phosphorus oxychloride substantially at the rate at which it reacts to sodium alkoxide to facilitate reaction and help control the reaction temperature. The alkoxide exchange may be catalyzed for example, with aluminum isopropoxide. A catalyst is not necessary and I prefer not to use one. Preferably the alkoxide exchange and the esterification of the product sodium alkoxide with phosphorus oxychloride are conducted in an atmosphere of an inert gas, such as nitrogen, to assure good color in the phosphate ester product.

The following examples, illustrating the novel method disclosed herein, are given without any intention that the invention be limited thereto; all parts and percentages are by weight.

EXAMPLE 1

2-ethylhexanol (412 grams) and 244 grams of a mixture of two parts of butanol and one part of dibutyl ether were placed in a flask equipped with a nitrogen inlet, thermometer well, agitator, and a 10-ball Snyder fractionating column at the top of which was fitted an addition funnel and a Dean-Stark trap for removal of water. The apparatus was purged with nitrogen, the mixture was heated to reflux, and 100 grams of 50% sodium hydroxide solution was added slowly through the funnel in 4.5 hours. Evolved water was collected in the trap during the addition and for one-half hour after the end of the addition. Then the distillation column was arranged for vacuum fractionation. Fractionation to remove butanol and dibutyl ether was started at a pressure of 185 millimeters, a pot temperature of 155° C., and a reflux ratio of 3:1 to 4:1. During the distillation, an additional 250 grams of 2-ethylhexanol was added to the system. Distillation was continued for 3.5 hours at a variable reflux ratio until 252 grams of butanol and dibutyl ether fractions were collected at the final conditions of 157° C. pot temperature and 150 millimeters of pressure. The residue weighed 623 grams and assayed 30% sodium 2-ethylhexoxide by titration for alkalinity. The apparent water content (actually the content of unconverted sodium hydroxide expressed as its water equivalent) was 0.03% by Karl Fisher analysis. To 608 grams of the residue was added 61.4 grams of phosphorus oxychloride in one-half hour at 35–40° C. The product was diluted with 350 milliliters of water and the nitrogen flow was stopped. The organic phase was separated from the two phases formed and washed several times with water and with dilute sodium bicarbonate solution. The washed crude product was stripped to 162° C. at 3 millimeters to remove excess 2-ethylhexanol, and the residue was washed twice with 1.5% sodium hydroxide solution. The organic phase was vacuum dried and filtered to produce a nearly quantitative yield of tris(2-ethylhexyl) phosphate assaying over 99% purity by gas-liquid chromatography.

EXAMPLE 2

A mixture of 275 grams of 2-ethylhexanol, 97 grams of butanol, and 62 grams of dibutyl ether was charged to the equipment described in Example 1 and a flow of nitrogen was started. The mixture was brought to reflux and 70 grams of 50% sodium hydroxide was added in four hours. Water was removed as in Example 1. After removal of 120 grams of analytical samples, 164 grams of 2-ethylhexanol was added and the system was arranged for vacuum fractionation. Removal of butanol and dibutyl ether was conducted as before to the final conditions of 157° C. in the pot and 135° C. overhead at 152 millimeters pressure. The residue weighed 410 grams of which 223 grams was removed for reaction with 22.3 grams of phosphorus oxychloride. The phosphorus oxychloride was added at 35–40° C. in 15 minutes. Water was added to the product mixture to form two phases and the nitrogen flow was stopped. The organic layer was separated, washed, stripped of excess 2-ethylhexanol, washed with dilute caustic, and dried. The product tris(2-ethylhexyl) phosphate assayed 99.8% pure by chromatographic analysis and was obtained in a yield of 94% based on the weight of phosphorus oxychloride charged. Its refractive index was 1.4420 at 25° C.

EXAMPLE 3

Butanol, 1320 grams, was charged into a flask fitted with an inert-gas purge system, agitator, thermometer-well, and Snyder column which was surmounted by an adding funnel and Dean-Stark water trap. The inert-gas purge was started, the butanol was brought to reflux, and 240 grams of 50% sodium hydroxide was added in five hours. Refluxing was continued with removal of water until 180 grams of water had been removed. The residue weighed 1374 grams; after removal of analytical samples 1334 grams remained. To the flask was added 417 grams of 2-ethylhexanol. Vacuum distillation at a 1:1 reflux ratio was conducted and an additional 834 grams of 2-ethylhexanol was added in four hours while 1154 grams of butanol was removed in 5.5 hours. The reflux ratio was gradually increased to 10:1 while an additional 209 milliliters of distillate was removed. Final distillation conditions were: pressure, 200 millimeters; pot temperature, 164° C.; vapor temperature, 144° C. The apparent moisture content (actually free sodium hydroxide) at this point was 0.05%. After removal of 100 grams for analysis, 1313 grams of the residue was treated with 132 grams of phosphorus oxychloride added in one hour at 40° C. The reaction mixture was quenched by the addition of 700 milliliters of water and the inert gas purge was terminated. The organic phase was separated and washed again with water, then stripped to final conditions of 165° C. and three millimeters pressure. The residue was washed with 1.5% aqueous sodium hydroxide, and with water, and dried. The product weighed 355 grams corresponding to a yield of 95% and was 99.8% pure. Its refractive index at 25° C. was 1.4420, and its specific gravity at 20° C. was 0.923.

EXAMPLE 4

A two-liter, three-necked flask was equipped with a magnetic stirrer, thermometer, feed funnel, 10-plate Oldershaw column with a magnetic take-off reflux head, and vacuum and nitrogen systems. The apparatus was purged with nitrogen and 592 grams of dry butanol was charged to the flask and heated to 90° C. Forty-six grams of sodium metal spheres was added in small amounts to the flask. The mixture was stirred during the addition and heated to 115° C. during the last part of the addition to complete dissolution and reaction of the sodium. The reaction mixture was allowed to cool overnight under nitrogen whereupon it formed a white gel. Three hundred thirty-two grams of Alfol® 8–10 (a commercial mixture of octyl and decyl alcohols from Continental Oil Company) was added to the gel, and the mixture was heated to reflux at 200 millimeters pressure. Then 1015 grams of Alfol® 8–10 was added to the flask over a period of four hours. Forty minutes after the Alfol® 8–10 feed was started, distillation of butanol was begun and continued for five hours. During the alkoxide exchange and butanol removal the pressure in the system was reduced to 100 millimeters and then to 50 millimeters; the final distillation temperature was 152° C. The product, a mixture of the sodium alkoxides of octyl alcohol and decyl alcohol, contained no butanol as determined by gas-liquid chromatography of the organic phase formed by quenching a sample of the solution in salt water.

Using the same procedure as that of Example 1, the synthesis can be carried out by substituting for n-butanol; iso-butanol, 1-pentanol, 2-methyl-1-butanol and 3-methyl-1-butanol.

As will be apparent to those skilled in the art, numerous modifications and variations of the process illustrated above may be made without departing from the spirit of the invention or the scope of the following claims.

What is claimed is:

1. A process for the preparation of tris ($C_6$ to $C_{12}$ alkyl) phosphates comprising: (a) heating a mixture of a $C_4$ to $C_5$ saturated, primary alcohol and a $C_6$ to $C_{12}$ alcohol to reflux in a reaction vessel equipped with a column; (b) adding an alkali metal hydroxide as a concentrated aqueous solution into the top of the column so reaction between the alkali metal hydroxide and $C_4$ to $C_5$ alcohol and the dehydration to form an alkoxide take place in the top of the column forming an alkali metal $C_4$ to $C_5$ alkoxide which is non-volatile and drops from the column into the reaction vessel where the alkali metal $C_4$ and $C_5$ alkoxide reacts with the excess $C_6$ to $C_{12}$ alkyl alcohol to form a mixture of alkali metal $C_6$ to $C_{12}$ alkoxide, alkali metal $C_4$ to $C_5$ alkoxide, $C_6$ to $C_{12}$ alkyl alcohol and $C_4$ to $C_5$ alcohol; (c) continue heating the mixture to effect an alkoxide exchange; (d) removing the $C_4$ to $C_5$ alcohol by distillation to leave pure alkali metal $C_6$ to $C_{12}$ alkoxide; (e) reacting the alkali metal $C_6$ to $C_{12}$ alkoxide with phosphorus oxychloride at a temperature between 0° and 100° C. to give a tris ($C_6$ to $C_{12}$ alkyl) phosphate.

2. The process of claim 1 in which the C to $C_{12}$ alkyl alcohol is 2-ethylhexanol.

3. The process of claim 1 in which the alkali metal hydroxide is sodium hydroxide.

4. The process of claim 1 in which the $C_4$ to $C_5$ alcohol is normal butanol.

5. The process of claim 1 in which the mixture of alkali metal $C_6$ to $C_{12}$ alkoxide, alkali metal $C_4$ to $C_5$ alkoxide, $C_4$ to $C_5$ saturated primary alcohol and $C_6$ to $C_{12}$ alkyl alcohol is heated to 75° C. to 255° C.

6. The process of claim 1 in which the reaction mixture is heated to 75° C. to 255° C.

7. A process for the preparation of tris ($C_6$ to $C_{12}$ alkyl) phosphates comprising: (a) heating a reaction mixture of a $C_4$ to $C_5$ alkyl alcohol and a $C_6$ to $C_{12}$ saturated primary alcohol to reflux with an alkali metal hydroxide and continuously removing water, substantially at the rate at which is formed from the mixture by fractional distillation to form a mixture of alkali metal $C_4$ to $C_5$ alkoxide and alkali metal $C_6$ to $C_{12}$ alkoxide; (b) continuing fractional distillation of the mixture to remove the lower alcohol and form alkali metal ($C_6$ to $C_{12}$) alkoxide free of the lower alkoxide; and (c) reacting the alkali metal $C_6$ to $C_{12}$ alkoxide with phosphorous oxychloride at a temperature between 0° and 100° C. to give a tris ($C_6$ to $C_{12}$ alkyl) phosphate.

8. The process of claim 7 in which the $C_6$ to $C_{12}$ alkyl alcohol is 2-ethylhexanol.

9. The process of claim 7 in which the alkali metal hydroxide is sodium hydroxide.

10. The process of claim 7 in which the $C_4$ to $C_5$ alcohol is normal butanol.

References Cited

UNITED STATES PATENTS

| | | | |
|---|---|---|---|
| 2,069,404 | 2/1937 | Cunningham | 260—632 A |
| 3,020,303 | 2/1962 | Pianfetti et al. | 260—974 |

CHARLES B. PARKER, Primary Examiner

A. H. SUTTO, Assistant Examiner

U.S. Cl. X.R.

260—632 A, 963